Sept. 12, 1944.    J. MIHALYI    2,358,083
EXPOSURE CONTROL DEVICE
Filed Feb. 16, 1942    3 Sheets-Sheet 1
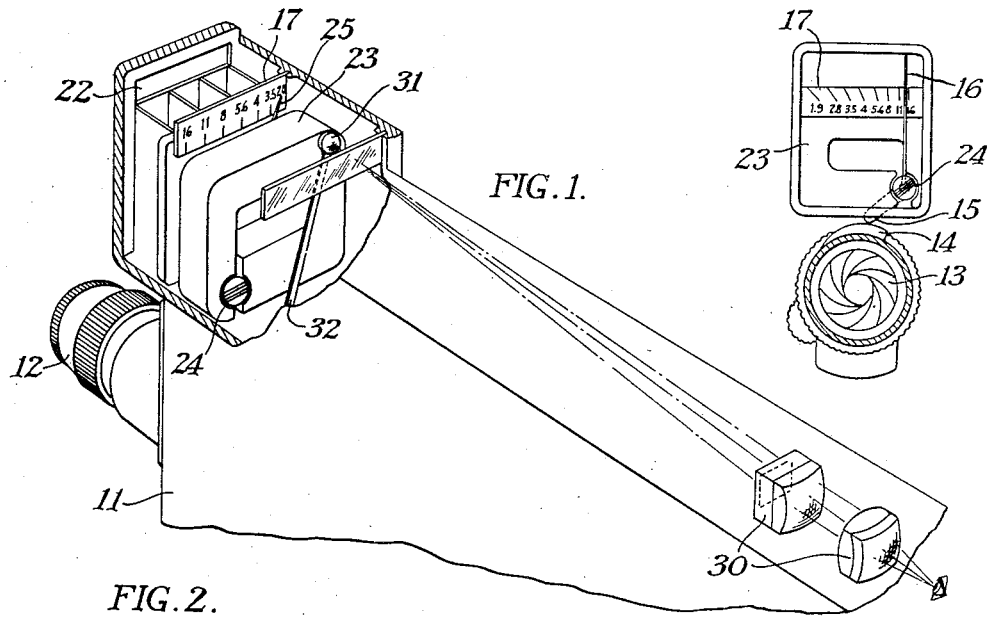
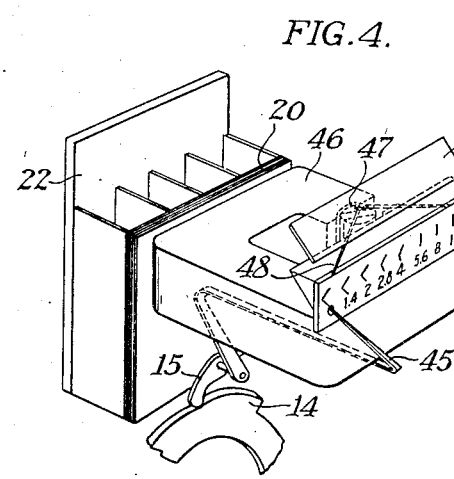
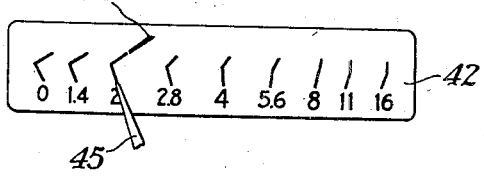
JOSEPH MIHALYI
INVENTOR
BY
ATTY & AG'T

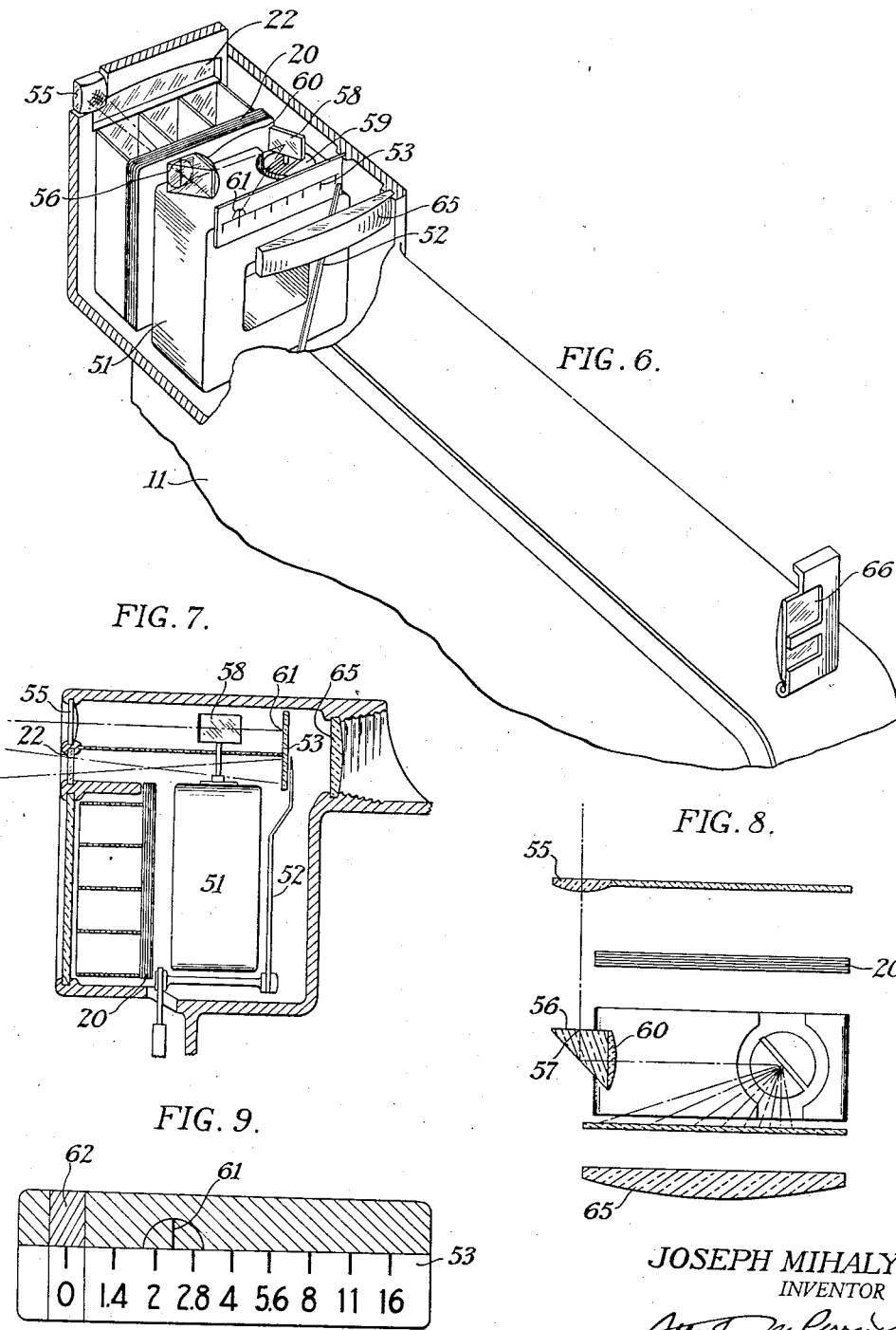

Sept. 12, 1944.   J. MIHALYI   2,358,083
EXPOSURE CONTROL DEVICE
Filed Feb. 16, 1942   3 Sheets-Sheet 3

JOSEPH MIHALYI
INVENTOR

BY

ATT'Y & AGT

Patented Sept. 12, 1944

2,358,083

UNITED STATES PATENT OFFICE 2,358,083

EXPOSURE CONTROL DEVICE

Joseph Mihalyi, Rochester, N. Y., assignor to Eastman Kodak Company, Rochester, N. Y., a corporation of New Jersey Application February 16, 1942, Serial No. 431,014

9 Claims. (Cl. 88—23)

This invention relates to exposure control devices for use with photographic cameras, and particularly to those built into a camera so that their scale reading can be matched by a pointer coupled to the diaphragm or shutter setting mechanism.

The exposure through a camera lens is controlled both by the shutter and the diaphragm settings. The present invention is useful with either of these exposure control devices, but since in motion pictures the shutter speed is usually fixed, and since even with still cameras, it is more convenient to adjust only the diaphragm with respect to the reading of a photoelectric exposure meter, the present invention will be described particularly with reference to the diaphragm control means. As is well known, the greater the output of the photoelectric cell, which output is substantially linearly proportional to the intensity of the light striking it, the smaller should be the aperture opening to give the same exposure to the film in the camera. However, the stops on a camera are in geometrical ratio each smaller stop transmitting one-half the light of the previous stop. Thus, at low levels of illumination, even a small linear change in intensity requires a large change in aperture.

The primary object of the present invention is to provide a convenient means for magnifying the reading of the photoelectric cell at values corresponding to large apertures.

This main object is accomplished by having a photoelectric cell operating a galvanometer and having a substantially linear scale for the galvanometer marked in lens aperture (or shutter setting) units, the end of the scale corresponding to the smallest aperture (or the shortest exposure) being nearest to the pivot point of the galvanometer. Thus the sensitivity of the device at wide aperture readings is relatively magnified compared to the rest of the scale. Of course, in practice, the very smallest aperture reading on the scale may be slightly beyond the point nearest to the galvanometer pivot, but it is still approximately the closest point to the pivot. Although it is not absolutely necessary that the scale be strictly linear, just so long as the smallest aperture point is the one nearest to the galvanometer pivot and the other points of the scale are at successively greater distances, I have found that a linear scale gives almost ideal results and it is the most convenient to manufacture. Of course, the shape of the pole pieces of the galvanometer cooperates with the orientation of the scale to determine the relative sensitivity at different points. It is well known, however, that satisfactory pole pieces cannot be made to give sufficient change in sensitivity to overcome the lack of uniformity which is practically eliminated by the present invention. The preferred embodiment of the present invention has the aperture stops along the scale distributed substantially uniformly.

It is an object of an incidental embodiment of the invention to provide means for indicating when the intensity of illumination is too small to permit sufficient exposure even at maximum aperture. This is accomplished by having a red filter or other distinguishing means over the portion of the galvanometer scale beyond the maximum aperture reading.

In a preferred embodiment of the invention, a pointer connected to the diaphragm adjusting means (or connected to the camera shutter setting means) is movable manually to match the galvanometer reading at which time the diaphragm (or shutter) is properly set. In one form of this embodiment, an optical index is used for the galvanometer by illuminating a mirror carried by the galvanometer and having the image of a spot light reflected from this mirror to the galvanometer scale. As before the diaphragm pointer may be matched against the reading of this spot of light on the scale.

In either of these systems, the pointer carried by the diaphragm or shutter setting means is moved manually and may be relatively heavy whereas the pointer or index carried by the galvanometer must be fairly light. For accurate reading of the galvanometer index it would be desirable to have a reading lens or even a microscope objective thereover. In some cases, a large reading lens covering the whole scale is useful, but, of course, this does not give as much magnification as is sometimes desired. According to a preferred embodiment of the invention a reading lens is carried by the pointer and over the pointer so that when the pointer is matched with the index, both the pointer and the index can be seen through this reading lens. This reading lens does not increase the load on the galvanometer whereas increased load on the manually set pointer is harmless anyway. This subcombination is useful with any photoelectric exposure control system in which a pointer is matched against a galvanometer index.

The objects and advantages of the various embodiments of the invention will be understood from the following description when read in connection with the accompanying drawings in which:

Fig. 1 is a perspective view of a camera partly broken away to illustrate one embodiment of the invention.

Fig. 2 is a vertical cross section of the embodiment shown in Fig. 1.

Fig. 3 is a front view partly in cross section of the embodiment shown in Fig. 1.

Fig. 4 illustrates a slightly different embodiment of the invention.

Fig. 5 shows the field of view seen in the exposure finder of a camera incorporating the embodiment shown in Fig. 4.

Fig. 6 is a broken-away perspective view of a different embodiment of the invention.

Figure 10:
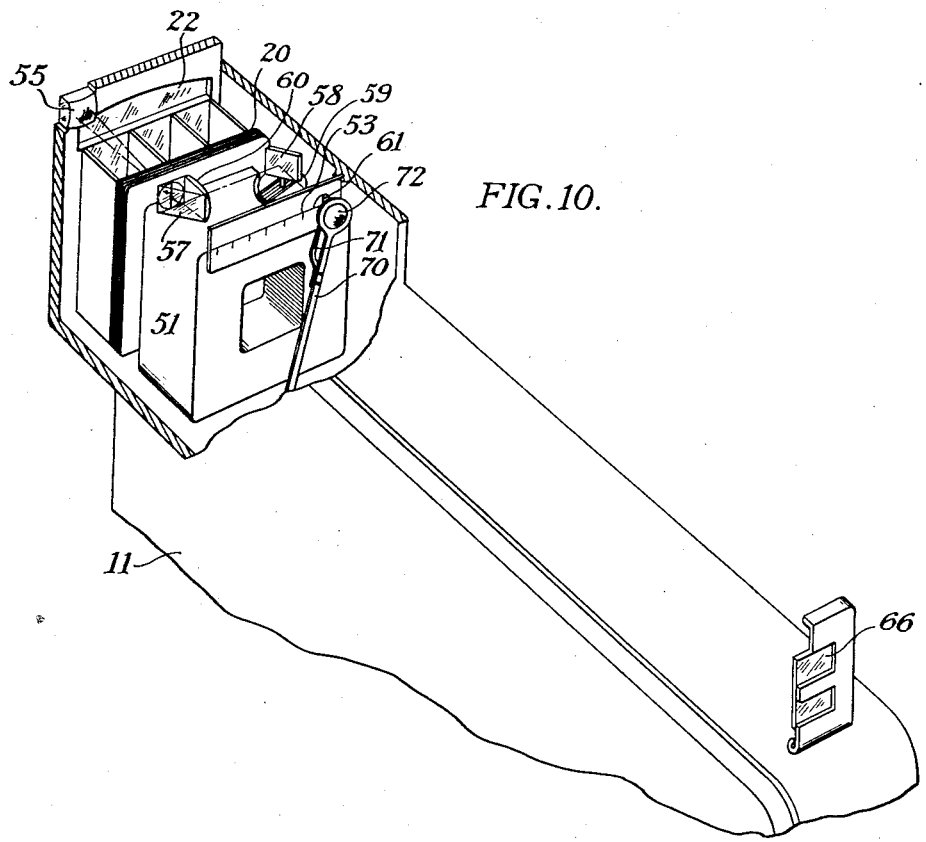

Figs. 7, 8, and 9 are respectively a vertical cross section, a horizontal cross section, and the exposure finder field of the embodiment shown in Fig. 6.

Fig. 10 shows a slight variation of the embodiment shown in Fig. 6.

In Fig. 1 a camera 11 only part of which is shown is provided with a lens 12 having a diaphragm 13 (best shown in Figs. 2 and 3) operated by a ring carrying a cam 14 which engages a cam arm 15 to rotate a pointer 16 over a scale 17. The scale is calibrated in aperture stops and is illuminated through a window 22 to be viewed through an eye-piece 30. To insure accurate reading of the scale, a reading lens or microscope objective 31 is positioned in alignment with the pointer 16 and is carried by an arm 32 pivoted on a rod 33 which is also turned by the cam rider 15. Light from the object to be photographed passes through a window 21 to strike a photoelectric cell 20 whose output is read by a galvanometer 24 having a magnet 23 and a pointer 25 which also reads on the scale 17. According to the present invention the scale 17 is a linear one and is arranged so that the smallest aperture stop (f/16 in the present case) is nearest to the galvanometer pivot 26. Of course, when no light is striking the photoelectric cell, the index 25 is beyond the high aperture end of the scale and the first few values at this high aperture end correspond to relatively low intensities. Therefore in the absence of the present invention the response of the meter would be insufficiently sensitive at this high aperture end.

As the galvanometer moves the index 25 over the scale, the lens 31 does not move with it, but as the pointer 16 is matched against the index 25, this lens 31 does come into alignment with the index permitting the final critical adjustment to be made quite accurately.

In the embodiment shown in Figs. 4 and 5 the galvanometer magnet 46 is disposed horizontally and the galvanometer pivot 47 is disposed vertically so that the pointer 48 moves over a horizontal scale and is illuminated by light received through the window 22 and reflected from a mirror 40. This pointer 48 actually moves over a prism 41 so that a virtual image 48' as reflected by the hypothenuse surface of the prism 41 can be viewed adjacent to a scale 42 viewed horizontally in the same way as the scale 17. As before the lens diaphragm adjusting means is provided with a cam 14 and a cam rider 15, which in this case rotates a pointer 45 over the scale 42.

In the embodiment of the invention shown in Figs. 6, 7, 8, and 9, the galvanometer pivot 59 is also vertically oriented and carries a mirror 58. The galvanometer magnet is shown at 51, and the diaphragm pointer is shown at 52 movable over a scale 53 to be viewed as before through an eye-piece 66. Light through a condenser 55 illuminates an index 57 mounted on the front face of a prism 56 which reflects this light to the galvanometer mirror 58. A positive lens 60 on the exit surface of the prism 56 focuses an image of the index line 57 substantially on the scale 53 as shown at 61. The change in focus as the image 61 moves along the scale 63 is not sufficient to blur the image too much, but for best results, the lens 60 has such power that the image 61 is in accurate focus about midway along the scale 53. As before, the end of the scale 53 corresponding to the smallest aperture setting is nearest the pivot point of the galvanometer 59 and the aperture stops are substantially uniformly distributed along this scale.

When the intensity of illumination falls below that which will give useful exposure even at maximum aperture, the galvanometer index 61 moves beyond the largest aperture reading on the scale and for warning purposes this part of the scale is preferably covered with a red filter 62 as best seen in Fig. 9. To permit easy reading of the scale a large reading lens 65 is positioned thereover as shown.

Fig. 10 shows a preferred embodiment of the arrangement shown in Fig. 6 in which the large reading lens 65 is replaced by a small reading lens 72 carried by the pointer arm 70 which also carries the pointer 71 to be read against the scale 53. Since an optical index is used for the galvanometer, the load thereon is a minimum and yet by having the reading lens 72 carried on the pointer to be matched against the index, one is permitted easy viewing of the index 61 at the time an accurate reading is to be made.

Having thus described the preferred embodiments of my invention, I wish to point out that it is not limited to these structures, but is of the scope of the appended claims.

What I claim and desire to secure by Letters Patent of the United States is:

1. An exposure control device comprising a photoelectric cell, a galvanometer connected to and operated by the photoelectric cell, a scale for the galvanometer labelled in lens aperture units and consisting of a substantially straight row of short marks along which row the galvanometer index moves, the end of the row corresponding to the smallest aperture being nearer to the pivot point of the galvanometer whereby the sensitivity of the device at wide aperture readings is relatively magnified.

2. An exposure control device comprising a photoelectric cell, a galvanometer connected to and operated by the photoelectric cell, a scale for the galvanometer labelled in lens aperture units and consisting of a substantially straight row of short marks along which row the galvanometer index moves, the end of the scale corresponding to the smallest aperture being nearest to the pivot point of the galvanometer and the remainder of the scale being disposed at continuously greater distances from said pivot point whereby the sensitivity of the device at wide aperture readings is relatively magnified.

3. A device according to claim 2 wherein the aperture stops are substantially uniformly distributed along the scale.

4. An exposure control device comprising a photoelectric cell, a galvanometer connected to and operated by the photoelectric cell, a substantially linearly disposed scale for the galvanometer labelled in exposure control units and consisting of a substantially straight row of short marks along which row the galvanometer index moves, the end of the row corresponding to the least exposure being nearer to the pivot point of the galvanometer whereby the sensitivity of the device at great exposures is relatively magnified.

5. An exposure control device comprising a photoelectric cell, a galvanometer connected to and operated by the photoelectric cell, a scale for the galvanometer labelled in exposure control units and consisting of a substantially straight row of short marks along which row the galvanometer index moves, the end of the scale corresponding to the least exposure being nearest to the pivot point of the galvanometer and the remainder of the scale being disposed at continuously greater distances from said pivot point whereby the sensitivity of the device at great exposures is relatively magnified.

6. In combination, a camera having a diaphragm, means for adjusting the diaphragm in accordance with a scale in which the aperture stops are substantially uniformly distributed in a straight row, an exposure control index visible adjacent to said scale to indicate the proper diaphragm setting, a photoelectric cell and a galvanometer operated by said photoelectric cell and having said index as its reading index, the pivot of the galvanometer being unsymmetrically located relative to the scale and nearest to the small aperture end thereof.

7. The combination according to claim 6 in which the index is a spot of light reflected from a mirror carried by the galvanometer.

8. The combination according to claim 6 in which the index is a pointer carried by the galvanometer.

9. The combination according to claim 6 in which the diaphragm adjusting means carries a reading lens movable therewith and over the scale to permit accurate viewing of the index.

JOSEPH MIHALYI.